United States Patent [19]
Skoglund

[11] Patent Number: 5,971,012
[45] Date of Patent: Oct. 26, 1999

[54] CONSTANT FLOW CONTROL VALVE HAVING MATABLE PISTON SLEEVE AND OUTLET COVER

[76] Inventor: Paul K. Skoglund, 2222-79th Ave., Ne, Bellevue, Wash. 98004

[21] Appl. No.: 09/052,795

[22] Filed: Mar. 31, 1998

Related U.S. Application Data

[63] Continuation of application No. 08/816,642, Mar. 13, 1997, abandoned, which is a continuation of application No. 08/416,340, Apr. 4, 1995, abandoned, which is a continuation-in-part of application No. 08/224,477, Apr. 7, 1994, Pat. No. 5,487,405, which is a continuation-in-part of application No. 08/069,459, Jun. 1, 1993, Pat. No. 5,301,713.

[51] Int. Cl.$^6$ ....................................................... G05D 7/01
[52] U.S. Cl. ................................................................ 137/501
[58] Field of Search ................................................ 137/501

[56] References Cited

U.S. PATENT DOCUMENTS

| | | | |
|---|---|---|---|
| 562,131 | 6/1896 | Gordon | 137/501 |
| 3,643,685 | 2/1972 | Hays | 137/501 |
| 4,098,285 | 7/1978 | Karing | 137/501 X |
| 5,107,886 | 4/1992 | Taylor | 137/501 |

*Primary Examiner*—Stephen M. Hepperle
*Attorney, Agent, or Firm*—Seed and Berry LLP

[57] ABSTRACT

A valve comprises a valve body having an inlet and an outlet defining a flow passage through the valve body. A piston is mounted in a bore intersecting the flow passage and the piston divides the bore into first and second chambers. The piston remains substantially motionless during upstream pressure fluctuations after the desired fluid flow rate through the valve has been established. A reference pressure passage communicates with the inlet and the first chamber of the bore. Springs in the second chamber bias the piston against the fluid pressure from the first chamber. A sleeve on the piston is configured to variably sheath a cover over the outlet such that reciprocation of the piston during initiation of fluid flow through the valve varies the effective area of openings in the cover to achieve the desired differential pressure across the flow control throttle, thus setting the flow rate constant unless the throttle position is changed.

19 Claims, 2 Drawing Sheets

CONSTANT FLOW CONTROL VALVE HAVING MATABLE PISTON SLEEVE AND OUTLET COVER

CROSS-REFERENCE TO RELATED APPLICATIONS

This application is a continuation of U.S. patent application Ser. No. 08/816,642, filed Mar. 13, 1997 now abandoned, which is a continuation of U.S. patent application Ser. No. 08/416,340 filed Apr. 4, 1995, entitled "Flow Control Valve Having Matable Piston Sleeve and Outlet Cover", now abandoned, which is in turn a continuation-in-part of U.S. patent application Ser. No. 08/224,477 filed Apr. 7, 1994, entitled "Flow Control Valve Having Flow Adjustable by Variable Ring", issued Jan. 30, 1996 as U.S. Pat. No. 5,487,405, which is in turn a continuation-in-part of U.S. patent application Ser. No. 08/069,459 filed Jun. 1, 1993, entitled "Flow Control Valve Having Adjustable Piston for Varying Flow Rate", issued Apr. 12, 1994 as U.S. Pat. No. 5,301,713.

BACKGROUND OF THE INVENTION

The present invention relates to constant fluid flow regulators and more particularly to a flow regulator having a spring biased piston and being capable of maintaining a constant fluid flow rate in both high pressure, low volume and low pressure, high volume environments with changes in inlet or outlet pressure. The present invention also accommodates high pressure, high volume and low pressure, low volume systems. Most prior art constant fluid flow regulators vary fluid flow through the piston by movement of the piston that varies the flow pressure through the piston or by change in the spring tension. More specifically, constant fluid flow regulators taught in the prior art regulate fluid flow by adjustment screws that directly vary spring tension by attachment to the piston spring itself. Other regulators change fluid flow by altering piston position via springs and ball bearings located over the piston. The system employing springs and ball bearings is subject to extreme torque due to the fluid pressure in the chamber.

Additionally, multiple poppet type valves may be used for low pressure, high volume fluid flow regulation. The above prior art, however generally cannot accommodate high pressure, low volume fluid flow. This invention, on the other hand, is able to provide constant fluid flow in high or low pressure and high or low volume ranges. The present invention is also different from the above sliding sleeve and multiple poppet type valves in that the piston of the valves of the prior art moves relative to the valve body to vary fluid flow as the pressure changes, while the piston of the present invention does not move substantially relative to the valve body after fluid flow has stabilized. Instead, constant spring force on the piston in the present invention allows constant pressure across the piston, therefore the flow is constant. The present invention thus experiences less wear and tear from moving parts.

Additionally, U.S. Pat. No. 4,893,649 issued to Skoglund and U.S. Pat. No. 3,958,596 issued to Gerrard both disclose valves in which fluid flow variation is implemented by an adjustable valve seat. Adjustment of the valve seat adjusts the spring tension, which in turn alters the pressure differential across the piston. However, both of the above prior art patents employ threaded, screw-type mechanisms for adjusting the valve seat which are difficult to operate, have a narrow operating range, and are prone to breakage in high pressure environments.

Also, the screw-type valve seat adjustment mechanisms of the above prior art references both impede fluid flow through the valve. U.S. Pat. No. 4,893,649, discloses a valve in which the fluid outlet is oriented perpendicular to the fluid inlet in order to accommodate the valve seat adjustment mechanism. This angled fluid flow pathway results in a more complex valve design as well as increased fluid turbulence and higher pressure drops. U.S. Pat. No. 3,958,596 issued to Gerrard teaches a valve in which the fluid outlet passes axially through the valve seat adjustment screw. This valve seat adjustment mechanism configuration is difficult to use while the valve is in operation.

The constant flow rate controller valves discussed in U.S. Pat. Nos. 5,143,116 and 5,234,025, both issued to Skoglund, operate based on the following force balance equations.

$$P_1 A_{piston} = P_2(A_{piston} - A_{pin}) + KX + P_3 A_{pin}$$

Where
$P_1$=pressure in the first chamber
$A_{piston}$=surface area of the piston
$P_2$=pressure in the second chamber
$KX$=spring force of the springs
$A_{pin}$=in surface area of the piston pin which mates with the seat
$P_3$=pressure at the outlet port Rearrangement of terms produces the following equations:

$$P_1 A_{piston} = P_2 A_{piston} - P_2 A_{pin} + KX + P_3 A_{pin}$$

$$(P_1 - P_2) A_{piston} = KX - P_2 A_{pin} + P_3 A_{pin}$$

$$\Delta P = P_1 - P_2 = \frac{KX - P_2 A_{pin} + P_3 A_{pin}}{A_{piston}}$$

Because $A_{pin}$ is small in comparison to $A_{piston}$, and assuming $P_3$ equals the flow pressure at the outlet port, the following equations characterize the force balance existing in these inventions.

$$KX = (P_1 - P_2) A_{piston} + P_2 A_{pin} - P_3 A_{pin}$$

($P_2 A_{pin}$ and $P_3 A_{pin}$ being relatively small in size)

$$KX \approx (P_1 - P_2) A_{piston}$$

Thus, the differential pressure ($P_1 - P_2$) is a function of spring force ($KX$), but is not precisely equal to spring force ($KX$).

The flow rate of water, for example, through a control valve is defined by the following equation:

$$Q = C_v \sqrt{\Delta P / sg}$$

Where
$\Delta P = -P_1 - P_2$
$Q$=flow rate
$P_1$=pressure in the first chamber
$P_2$=pressure in the second chamber $C_v$=flow resistance across the orifice Sg=Specific gravity of fluid Note that because the differential pressure ($P_1-P_2$) is a function of spring force (KX), flow rate (Q) is also a function of spring force. Thus, these constant flow rate controller valves have a constant flow as long as spring force remains constant. This flow is constant regardless of the flow pressure at the inlet port. However, there is a pressure force exerted on the piston pin which mates with the valve seat, and against the remainder of piston defined by $$P_3 \cdot A_{pin}$$

Where $P_3$=pressure at the outlet port $A_{pin}$ surface area of the piston pin The above force must be minimized for these valves to function pressure independently. Therefore, for the valves to function, the surface area of the piston pin must be small when compared to the surface area of the piston as a whole. Note that this force would not be small and the flow rate would not be constant if the area of the piston pin was not small in value when compared to the surface area of the piston as a whole. These valves therefore can have a limited number of different configurations, and must usually be relatively large.

However, in this invention the following equations apply:

$$P_1 A_1 = P_2 A_2 + KX$$

$$A_1 = A_2$$

$$P_1 A_1 - P_2 A_1 = KX$$

$$(P_1 - P_2) A_1 = KX$$

$$P_1 - P_2 = \frac{KX}{A_1}$$

The area of the outlet $A_3$ and outlet pressure $P_3$ are no longer factors in the balance equation on the underside of the piston. These forces are transferred to the body and not to the piston. Therefore the $P_1-P_2$ valve across the piston and control surfaces is not impacted by $P_3$ and $A_3$. This is a change from the prior art.

SUMMARY OF THE INVENTION

A valve comprises a valve body having an inlet and an outlet defining a flow passage through the valve body. A piston is mounted in a bore intersecting the flow passage and the piston divides the bore into first and second chambers. The piston remains substantially motionless during upstream pressure fluctuations after the desired fluid flow rate through the valve has been established. A reference pressure passage communicates with the inlet and the first chamber of the bore. Springs in the second chamber bias the piston against the fluid pressure from the first chamber. A sleeve on the piston is configured to variably sheath a cover over the outlet such that reciprocation of the piston during initiation of fluid flow through the valve varies the effective area of openings in the cover to achieve the desired pressure across the piston. The sleeve locates such that a force balance is achieved on the piston between the first and second chambers set by the piston spring to cause equilibrium.

In operation, the piston is initially spring biased toward the top portion of the valve. Fluid flowing into the controller valve via the inlet port and through the reference pressure passage increases the pressure in the chamber above the piston, forcing the piston sleeve over the outlet cover. The piston sleeve thus blocks the outlet cover openings, preventing fluid flow to the outlet port. The pressure in the chamber below the piston builds as fluid enters through the openings in the piston sleeve until the pressure force in this lower chamber plus the piston spring force is greater than the pressure force in the chamber above the piston. The piston then lifts the sleeve from at least a portion of the outlet cover, and at least a partial fluid pathway through the cover openings to the outlet orifice is opened. An equilibrium flow rate is reached (i.e., when the pressure forces in the upper chamber equals the pressure forces in the lower chamber plus the spring force) by variation in the piston position based on the interaction of the above fluid pressure forces and spring force.

Importantly, after the desired flow rate has been attained, the piston no longer moves substantially relative to the valve body unless fluid flow is altered by the valve's flow throttle. Minute movement of the piston does occur when there is a pressure change across the valve, but this piston movement only sets the pressure differential across the piston, and does not directly change the flow rate through the valve. Instead, constant flow rate is maintained despite pressure changes because the spring force maintains a constant pressure differential pressure between the two valve chambers, and not by piston sleeve movement relative to the outlet cover.

DESCRIPTION OF THE DRAWINGS

A more complete appreciation of the invention may be had by reference to the accompanying drawing illustrating preferred embodiments of the invention to be described in detail, wherein.

DESCRIPTION OF THE PREFERRED EMBODIMENT

Figure 1:
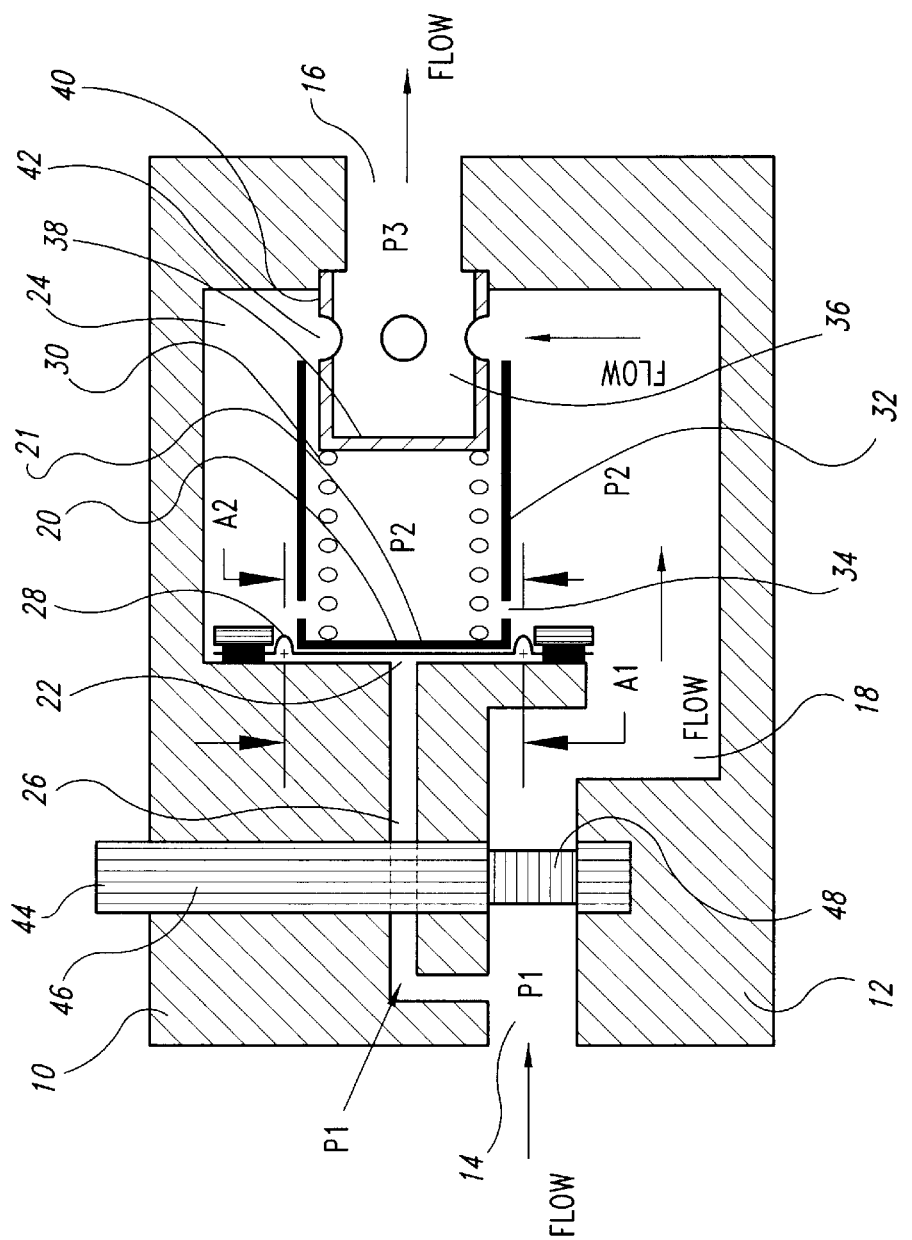
FIG. 1 is a cross-sectional view of a first embodiment of the present invention.
Figure 2:
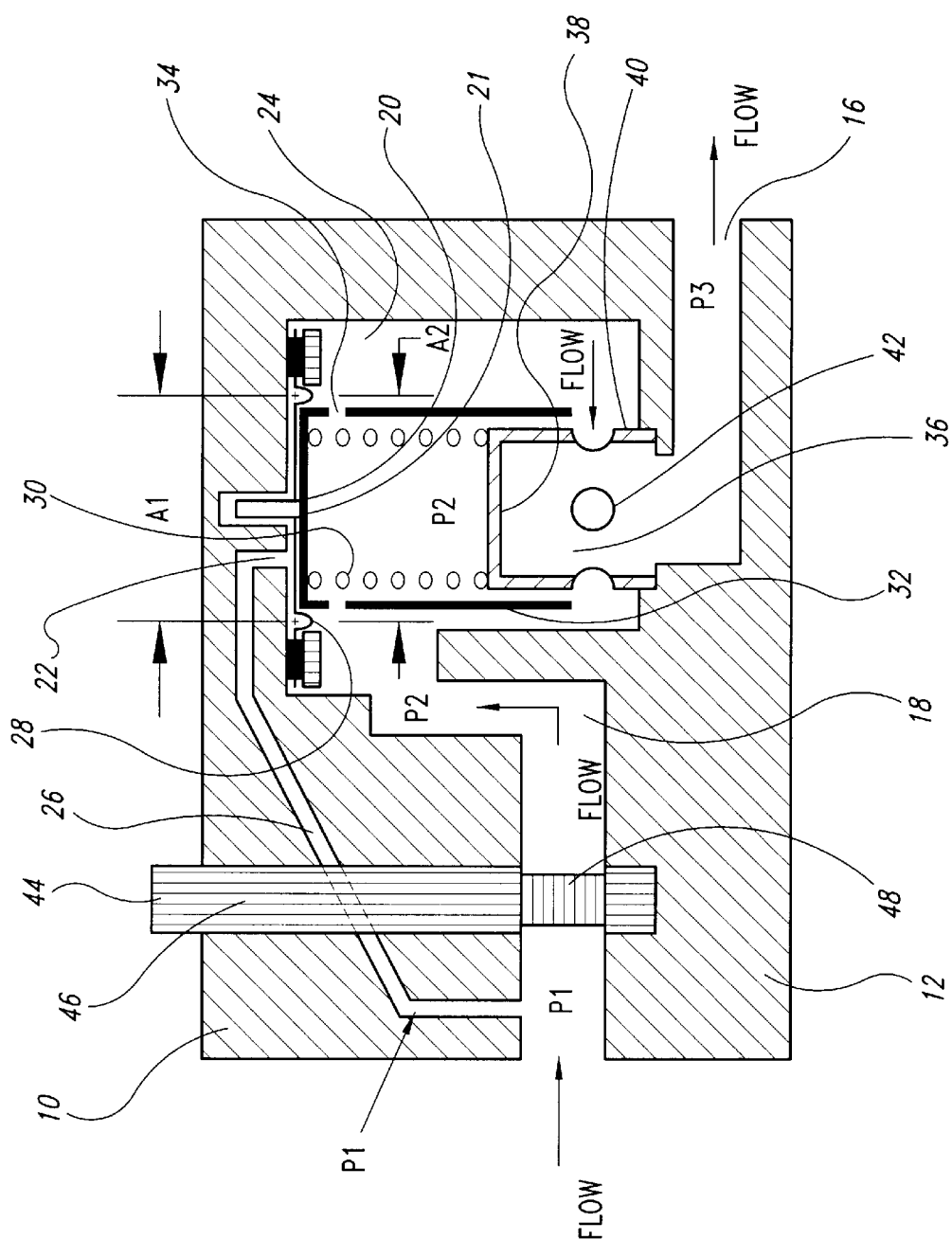
FIG. 2 is a cross-sectional view of a second embodiment of the present invention.

Referring to the FIGS. 1 and 2, the reference numeral 10 indicates the constant flow rate controller valve, as a whole. Valve 10 has a valve body 12 having at its top portion an inlet port 14, and having at its bottom portion an outlet port 16. A bore 18 is formed within valve body 12.

A piston 20 having a head 21 is disposed within bore 18 such that a portion of bore 18 is divided into chamber 22 above piston head 21 and chamber 24 below piston 20. Piston 20 is preferably of a generally cylindrical configuration.

Reference pressure passage 26 connects chamber 22 and inlet port 14, and allows fluid of a reference pressure, $P_1$, to enter chamber 22 and contact area $A_1$ of piston head 21.

In order to prevent fluid flow around the periphery of piston 20 when this invention is employed in high fluid pressure environments, seal 28 is placed around the periphery of piston 20. Seal 28 is preferably a cup or diaphragm seal. As clearly shown in FIGS. 1 and 2, seal 28 extends across chamber 21 has a central portion 28A covering the piston head 21, an arcuate outer portion 28B connected to the central portion and spaced around the periphery of the piston head radially outward of the piston head. The arcuate outer portion 28B is positioned in the space between piston head 21 and valve body 12. Seal 28 also has an edge portion 28C connected to arcuate outer portion 28B and coupled to valve body 12 about the outlet of reference pressure passage 26.

Within chamber 24 are springs 30 which contact piston 20 and bias piston 20 upwardly toward chamber 22. Springs 30 may be coil type springs for example. By employing coil type springs for springs 30, the desired differential pressure ($P_1-P_2$) across the piston (chambers 22 and 24) may be conveniently altered by changing the spring force. The differential pressure across the piston stabilizes after flow throttle 44 (discussed below) is adjusted and constant flow is achieved. The valve is then pressure independent at the new flow setting, and piston 20 no longer moves substantially even if the upstream pressure does fluctuate.

Referring again to piston 20, sleeve 32 is connected under piston head 21 in chamber 24, and is preferably tubular. Sleeve openings 34 are one or more in number and are preferably radially disposed around sleeve 32. Sleeve openings 34 allow fluid to enter sleeve 32 of piston 20 and impart fluid pressure $P_2$ on area $A_2$ of piston head 21 in chamber 24.

Cover 36 is located over outlet port 16, and resides in chamber 24. Cover 36 is preferably cylindrical, having top 38 and sides 40. Cover openings 42 are one or more in number and are preferably radially disposed on sides 40 of cover 36. Cover openings 42 allow fluid to exit outlet port 16 from chamber 24.

Sleeve 32 is aligned in registration with cover 36 such that cover 36 guides reciprocation of piston 20 during initiation of fluid flow through valve 10. This reciprocation of piston 20 occurs only until the desired differential pressure set by springs 30 is established, after which piston 20, and sleeve 32 thereof, remain substantially motionless regardless of the occurrence of upstream fluid pressure fluctuations. If there is a pressure change across the valve (i.e., $P_1-P_3$), then there is a small movement of the piston 20 to rebalance the pressure differential ($P_1-P_2$) which is set by the springs 30. However, flow does not change even though sleeve 32 alters its sheathing of cover openings 42. The valve 10 has to take the full pressure drop across it ($P_1-P_3$). The springs 30 set the differential pressure across the flow throttle 44 ($P_1-P_2$) The rest of the pressure drop must be taken by the sleeve 32 and cover 36. If the pressure $P_1$ increases, the sleeve 32 and cover 36 must take the additional pressure drop across the valve 10 since the pressure differential across the flow throttle 44 has not changed. By definition, if the sleeve 32 and cover 36 are to take this higher pressure drop, the flow area through openings 42 must have decreased if the flow rate has not changed. As piston 20 reciprocates in bore 18 when fluid flow through valve 10 is initially being established, sleeve 32 variably sheaths cover 36 thereby varying the effective fluid flow area through cover openings 42 to achieve the desired pressure differential across the piston. While sleeve 32 has been described as tubular and cover 36 as cylindrical, these two components may have any shape as long as sleeve 32 variably sheaths cover 36 to alter the effective fluid flow area of cover openings 42.

The desired fluid flow rate through valve 10 is controlled by flow throttle 44 comprised on axially rotatable stem 46, and throttle opening 48 in inlet port 14. As seen in FIGS. 1 and 2, flow throttle 44 is positioned in the flow passage downstream of reference pressure passage 26 and upstream of chamber 24. Throttle opening 48 passes transversely through stem 46 and is oriented such that fluid flow from inlet port 14 passes therethrough and into chamber 24. Axial rotation of stem 46 varies the effective cross-sectional area of throttle opening 48 such that the fluid flow therethrough is varied. Note that plate-shaped throttles and many other throttle types known in the art can also be employed with the present invention.

The constant flow rate controller valve 10 operates based on the following force balance equations.

$$P_1 A_1 = P_2 A_2 + KX$$

Where
 $P_1$=pressure in chamber 22
 $A_1$=surface area of piston head 21 in chamber 22
 $P_2$=pressure in chamber 24
 KX=spring force of springs 30
 $A_2$=effective surface area of piston head 21 in chamber 24

It is important to note that, unlike prior art valves, the area ($A_3$) of outlet port 16 and the outlet pressure ($P_3$) thereof are not part of the force balance equation of the present invention because cover 36 over outlet port 16 transfers the force defined by ($P_3$)·($A_3$) to body 12 of valve 10, and not to piston 20, as in prior art valves.

Since $A_1=A_2$, rearrangement of terms produces the following equations:

$$P_1 A_1 - P_2 A_1 = KX$$

$$(P_1-P_2)A_1 = KX$$

$$P_1 - P_2 = \frac{KX}{A_1} = \Delta P$$

The flow rate of water, for example, through the constant flow rate controller valve 10 is defined by the following equation:

$$Q = C_v \sqrt{\Delta P / sg}$$

Where
 $\Delta P = P_1 - P_2$
 Q=flow rate
 $P_1$=pressure in chamber 22
 $P_2$=pressure in chamber 24
 $C_v$=flow resistance
 Sg=Specific gravity of fluid Note that because differential pressures ($P_1-P_2$) is a function of spring force (KX), flow rate (Q) is also a function of spring force. Thus, the constant flow rate controller valve 10 has a constant flow as long as ($P_1-P_2$) across the flow throttle 44 remains constant. This flow is constant regardless of the flow pressure at inlet port 14 and outlet port 16.

The constant flow rate controller valve 10 operates as follows. Fluid passes through inlet port 14, through reference pressure passage 26, and enters chamber 22. Piston 20, which is biased by springs 30 towards chamber 22, is pushed toward chamber 24 by the increased pressure in chamber 22, such that sleeve 32 blocks outlet cover openings 42, preventing fluid flow to outlet port 16. Chamber 24 is thus sealed.

Fluid flows into chamber 24 through sleeve openings 34 of piston sleeve 32 such that pressure $P_2$ is ultimately achieved on the bottom position of piston 20 in chamber 24.

When the flow pressure forces in chamber 24 plus the spring force (KX) of spring 30 exceeds forces caused by the pressure in chamber 22, piston 20 is pushed towards chamber 22, piston sleeve 32 is lifted from at least a portion of outlet cover 36 such that at least a partial fluid pathway through cover openings 42 to outlet port 16 is opened. A piston equilibrium position is next attained when the forces on piston 20 in chamber 22 equals the forces on piston 20 (which includes the spring force on spring 30) in chamber 24.

The above piston equilibrium position also provides the desired pressure differential across the flow throttle 44, the desired flow rate being set by flow throttle 44, which alters the flow resistance $C_v$. Without further substantial change in the position of piston 20, the flow rate will remain constant despite pressure changes across the valve because the spring force of springs 30 maintains a constant pressure differential between chamber 22 and chamber 24 and reference pressure fluid passage 26. Thus, piston 20 moves substantially during initiation of fluid flow through valve 10 or when flow throttle 44 is altered. However, when there is a pressure change across the valve 10, piston 20 will only move minutely to set the pressure differential ($P_1-P_2$) across piston 20 which, in turn, sets the flow rate; but this movement of piston 20 does not directly change the flow through valve 10.

While particular embodiments of the present invention have been described in some detail herein above, changes and modifications may be made in the illustrated embodiments without departing from the spirit of the invention.

I claim:

1. A constant flow controller valve comprising:

a valve body having an inlet and an outlet defining a single flow passage through said valve body;

a piston mounted in a bore intersecting said flow passage, said piston dividing said bore into first and second chambers, the effective surface area of said piston in said first chamber being essentially the same as the effective surface area of said piston in said second chamber, said piston having a piston head with periphery of a selected diameter, said piston consequently remaining substantially motionless during upstream pressure fluctuations after the desired fluid flow rate through said valve has been established;

a reference pressure passage in the valve body communicating with said inlet and said first chamber of said bore;

a biasing member coupled to said piston and biasing said piston against fluid pressure from said first chamber;

a diaphragm seal having a diameter greater than the diameter of said piston head and being positioned in said bore extending across said first chamber, said diaphragm seal having a central portion covering said the piston head, an arcuate outer portion connected to the central portion and spaced radially outward from the piston head and between said piston head and said valve body, and an edge portion connected to said outer portion and connected to said valve body, said diaphragm seal preventing any fluid from flowing from said first chamber into said second chamber toward said outlet;

an adjustable throttling member positioned in the flow passage downstream of the reference pressure passage and upstream of the second chamber, the throttling member being positionable relative to the inlet for varying the effective area of said inlet to vary the flow rate of fluid passing through said valve;

a sleeve on said piston and in said second chamber, said sleeve having at least one opening therein for entry of fluid pressure into said sleeve; and a cover over said outlet in said second chamber, said cover having at least one opening therein for passage of fluid through said cover and through said outlet, said sleeve being aligned to variably sheath said cover upon reciprocation of said piston during initiation of fluid flow through said valve and thereby vary the effective area of said cover opening to achieve a desired differential pressure across said piston.

2. The valve of claim 1 wherein said cover is fixedly attached to said valve body and said sleeve is fixedly attached to said piston.

3. The valve of claim 1 wherein fluid in said reference pressure passage applies pressure to said piston through said central portion of said diaphragm seal.

4. The valve of claim 1 wherein said sleeve is tubular and said cover is cylindrical.

5. The valve of claim 1 wherein a plurality of sleeve openings are present.

6. The valve of claim 1 wherein a plurality of cover openings are present.

7. The valve of claim 1 wherein registration of said sheath of said piston and said cover guides reciprocation of said piston.

8. A valve comprising:

a valve body having an inlet and an outlet defining a single flow passage through said valve body;

a piston having a piston head with a periphery of a selected diameter, said piston being mounted in a bore intersecting said flow passage, said piston dividing said bore into first and second chambers, the effective surface area of said piston in said first chamber being essentially the same as the effective surface area of said piston in said second chamber, said piston remaining substantially motionless after the desired fluid flow rate through said valve has been established;

a reference pressure passage in the valve body communicating with said inlet and said first chamber of said bore;

a biasing member coupled to said piston and positioned to bias said piston against fluid pressure from said first chamber;

a diaphragm seal having a diameter greater than the diameter of said piston head and being positioned in said bore extending across said first chamber, said diaphragm seal having a central portion covering said the piston head, an arcuate outer portion connected to the central portion and spaced radially outward from the piston head and between said piston head and said valve body, and an edge portion connected to said outer portion and connected to said valve body, said diaphragm seal preventing any fluid from flowing from said first chamber into said second chamber toward said outlet;

a sleeve on said piston and in said second chamber, said sleeve having at least one opening therein for entry of fluid pressure into said sleeve; and a cover over said outlet in said second chamber, said cover having at least one opening therein for passage of fluid through said cover and through said outlet, said sleeve being aligned to variably sheath said cover upon reciprocation of said piston during initiation of fluid flow through said valve and thereby vary the effective area of said cover opening to achieve a desired differential pressure across said piston whereby registration of said sheath of said piston and said cover guides reciprocation of said piston.

9. The valve of claim 8 wherein said cover is fixedly attached to said valve body and said sleeve is fixedly attached to said piston.

10. The valve of claim 8 wherein fluid in said reference pressure passage applies pressure to said piston only through said central portion of said diaphragm seal.

11. The valve of claim 8 further comprising:
an adjustment member positionable to vary the effective area of said inlet to vary the flow rate of fluid passing through said valve.

12. The valve of claim 8 wherein said sleeve is tubular and said cover is cylindrical.

13. The valve of claim 8 wherein a plurality of sleeve openings are present.

14. The valve of claim 8 wherein a plurality of cover openings are present.

15. A constant flow control valve comprising:
a valve body having an inlet and an outlet defining a single flow passage through said valve body;
a piston mounted in a bore intersecting said flow passage, said piston dividing said bore into first and second chambers, said piston having a piston head with a periphery of a selected diameter, and the effective surface area of said piston in said first chamber being essentially the same as the effective surface area of said piston in said second chamber;
a reference pressure passage in the valve body communicating with said inlet and said first chamber of said bore;
a diaphragm seal having a diameter greater than the diameter of said piston head and being positioned in said bore extending across said first chamber, said diaphragm seal having a central portion covering said the piston head, an arcuate outer portion connected to the central portion and spaced radially outward from the piston head and between said piston head and said valve body, and an edge portion connected to said outer portion and connected to said valve body, said diaphragm seal preventing any fluid from flowing from said first chamber into said second chamber toward said outlet;
a biasing member coupled to said piston biasing said piston against fluid pressure from said fist chamber;
a sleeve on said piston and in said second chamber, said sleeve having an opening therein for entry of fluid pressure into said sleeve; and
a cover over said outlet in said second chamber, said cover having an opening therein for passage of fluid through said cover and through said outlet, said sleeve being aligned to variably sheath said cover upon reciprocation of said piston during initiation of fluid flow through said valve and thereby vary the effective area of said cover opening to achieve the desired pressure differential across said piston, said biasing member being located within said sleeve.

16. A constant flow control valve comprising:
a valve body having an inlet and an outlet defining a flow passage through said valve body;
a piston mounted in a bore intersecting said flow passage, said piston dividing said bore into first and second chambers, said piston having a piston head with a selected diameter, the effective surface area of said piston in said first chamber being essentially the same as the effective surface area of said piston in said second chamber, said piston consequently remaining substantially motionless during upstream pressure fluctuations after the desired fluid flow rate through said valve has been established;
a reference pressure passage communicating with said inlet and said first chamber of said bore;
a diaphragm seal having a diameter greater than the diameter of said piston head and being positioned in said bore extending across said first chamber, said diaphragm seal having a central portion covering said the piston head, an arcuate outer portion connected to the central portion and spaced radially outward from the piston head and between said piston head and said valve body, and an edge portion connected to said outer portion and connected to said valve body, said diaphragm seal preventing any fluid from flowing from said first chamber into said second chamber toward said outlet;
a biasing member coupled to said piston and biasing said piston against fluid pressure from said first chamber;
an adjustable throttling member positioned in the flow passage, said throttling member being positionable to vary the effective area of said inlet to vary the flow rate of fluid passing through said valve;
a sleeve on said piston and in said second chamber, said sleeve having an opening therein for entry of fluid pressure into said sleeve; and
a cover over said outlet in said second chamber, said cover having an opening therein for passage of fluid through said cover and through said outlet, said sleeve aligned to variably sheath said cover upon reciprocation of said piston during initiation of fluid flow through said valve and thereby vary the effective area of said cover opening to achieve the desired differential pressure across said piston, said piston not being secured within said valve body but for registration of said sleeve of said cover.

17. The valve of claim 1 wherein the sleeve is movable over the cover to a closed position substantially blocking the fluid from passing through the outlet.

18. The valve of claim 1 wherein the throttling member is adjustable while the fluid is passing through the valve.

19. The valve of claim 15 wherein the sleeve is movable over the cover to a closed position substantially blocking the fluid from passing through the outlet.

* * * * *